United States Patent

Tada

[11] Patent Number: 5,860,881
[45] Date of Patent: *Jan. 19, 1999

[54] HYDRAULIC TENSIONER HAVING AN INTERNAL RACK MECHANISM

[75] Inventor: Naosumi Tada, Nabari, Japan

[73] Assignee: Borg-Warner Automotive, K.K., Japan

[*] Notice: The term of this patent shall not extend beyond the expiration date of Pat. No. 5,601,505.

[21] Appl. No.: 853,023

[22] Filed: May 8, 1997

[30] Foreign Application Priority Data

May 10, 1996 [JP] Japan .................................. 8-140649

[51] Int. Cl.$^6$ ........................................................ F16H 7/08
[52] U.S. Cl. .......................... 474/110; 474/111; 474/101
[58] Field of Search ..................... 474/101, 109, 474/110, 111, 122, 126, 112, 127, 136, 138; 92/118, 119, 123, 130, 51; 91/441; 464/87, 88, 89

[56] References Cited

U.S. PATENT DOCUMENTS

| | | | |
|---|---|---|---|
| 3,409,107 | 11/1968 | Shill | 464/89 X |
| 4,507,103 | 3/1985 | Mittermeier | 474/110 |
| 4,533,301 | 8/1985 | Foster | 92/130 X |
| 4,717,317 | 1/1988 | Hofer et al. | 92/51 X |
| 4,902,266 | 2/1990 | Ojima et al. | 474/111 |
| 5,004,448 | 4/1991 | Ojima | 474/111 |
| 5,006,095 | 4/1991 | Suzuki | 474/111 |
| 5,073,150 | 12/1991 | Shimaya | 474/110 |
| 5,277,664 | 1/1994 | Mott | 474/110 |
| 5,366,415 | 11/1994 | Church et al. | 474/110 |
| 5,601,505 | 2/1997 | Tada | 474/110 |
| 5,653,653 | 8/1997 | Ledvina | 474/110 |
| 5,658,212 | 8/1997 | Meurer et al. | 474/110 |

*Primary Examiner*—Rodney H. Bonck
*Assistant Examiner*—Marcus Charles
*Attorney, Agent, or Firm*—Sidley & Austin; Greg Dziegielewski

[57] ABSTRACT

A hydraulic tensioner having an internal rack mechanism is provided. The tensioner has an engagement aperture formed within the sleeve of the bore, a pin member attached to the piston that engages the engagement aperture, and an elastic member between the sleeve and bore.

6 Claims, 4 Drawing Sheets

HYDRAULIC TENSIONER HAVING AN INTERNAL RACK MECHANISM

This invention relates to a hydraulic tensioner for a power transmission device. More specifically, this invention relates to a hydraulic tensioner having a housing with a bore, a sleeve located inside the bore, a piston slidably received within the sleeve in the bore to form a fluid chamber, an engagement aperture formed within the sleeve, a pin member attached to the piston that engages the engagement aperture, and an elastic member between the sleeve and bore.

BACKGROUND OF THE INVENTION

A tensioning device, such as a hydraulic tensioner, is used to impart and maintain a certain degree of tension in the chain or belt that drives, for example, an engine camshaft. A hydraulic tensioner typically comprises a housing having a bore, and a piston having a rear end which is inserted into the bore of the housing. The piston is biased in a protruding or outward direction by a spring. A fluid chamber is formed by the inner wall surface of the bore and the rear end face of the piston. A fluid pressure source provides pressurized fluid through a passage in the housing to the fluid chamber.

When the tension of a chain or belt increases during engine operation, the piston receives a force in the retraction direction. For example, when the fluid chamber has an insufficient oil level or pressure, such as immediately after engine start-up or at low engine rpm, the piston retracts and the proper tension cannot be maintained for the chain or belt.

Hydraulic tensioners having a ratchet mechanism have been proposed to reduce or limit the retraction of the piston. For example, a hydraulic tensioner having a pin member attached to the rear end of the piston, wherein the pin member has an inside ratchet that engages with an engagement aperture is disclosed in Japanese Laid-Open Patent Heisei 6-42598. Because the force acting on the piston in the retraction direction is absorbed by the pin member and the engagement aperture, both the pin member and aperture tend to weaken after repeated extension and retraction of the piston. Moreover, in such a tensioner, increasing the thickness of the ratchet and pin member to increase durability would require enlargement of the housing.

The present invention is directed to the above-described problems in conventional hydraulic tensioners, and offers a hydraulic tensioner which further increases durability and conserves housing space.

SUMMARY OF THE INVENTION

The present invention is directed to a hydraulic tensioner having a housing with a bore, a cylindrical sleeve located within the bore, a piston slidably received within the sleeve in the bore to form a fluid chamber, a pin member that protrudes from the piston, an engagement aperture within the sleeve with which the pin member can engage, and an elastic member within the bore.

A first embodiment of the hydraulic tensioner of the present invention provides the above-described tensioner in which the sleeve is moveable both axially and rotatably with respect to the bore, and the outer periphery of the piston is axially moveable or slideable relative to the sleeve. A pin member is fixedly attached to the outer periphery of the piston. A spring biases the piston in a protruding direction from the bore. A passage in the housing connects the fluid chamber with a source of fluid. An engagement aperture is formed in the sleeve and extends diagonally in the axial direction within the bore. The pin member is positioned for engagement with the sides of the aperture. An elastic member is provided at the rear end face of the cylindrical sleeve to absorb the force of the pin member on the engagement aperture of the sleeve.

In a second embodiment, a hydraulic tensioner according to the first embodiment is provided wherein the engagement aperture is formed with a straight inclined surface and a rack member cut out on one end of the straight inclined surface, and at least one rack member cut out on the side of the engagement aperture opposite to the straight inclined surface.

In a third embodiment, a hydraulic tensioner according to the second embodiment is provided wherein the pin member engages the rack members of the engagement aperture. Retraction of the piston causes the pin member to move between the rack members; the rack members engage the pin member to prevent extension of the piston.

In a fourth embodiment, a hydraulic tensioner according to the first embodiment is provided wherein the elastic member comprises a sponge member.

In a fifth embodiment, a hydraulic tensioner according to the fourth embodiment is provided wherein an oil passage extends axially within the piston from a rear end face of the piston to an opening at the other end of the piston, and a relief valve in the oil passage opens and closes to permit the flow of oil through the oil passage.

In a sixth embodiment, a hydraulic tensioner according to the first embodiment is provided wherein the elastic member comprises a disc spring.

For a better understanding of these and other embodiments of the invention, reference should be made to the following detailed description taken in conjunction with the accompanying drawings.

DETAILED DESCRIPTION OF THE PREFERRED EMBODIMENTS

Turning now to the drawings, FIGS. 1–8 depict various embodiments of this hydraulic tensioner invention having an engagement aperture and elastic member.

Figure 1:
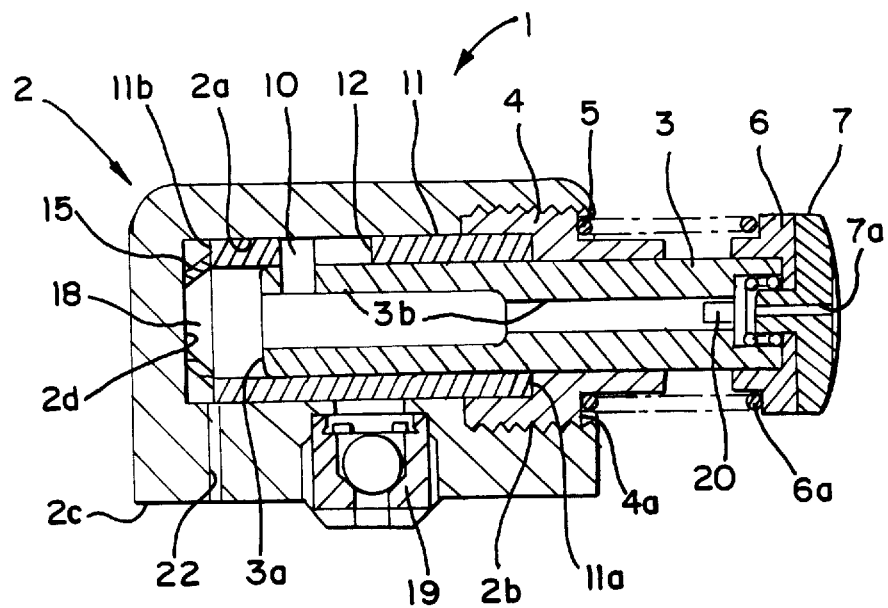
FIG. 1 is a front cross-sectional view of an embodiment of the present invention.

FIG. 1 illustrates one embodiment of the present invention. A hydraulic tensioner 1 has a housing 2 with a bore 2a that opens at one end. A piston 3 has a rear end which is inserted into the bore 2a. A support 4 slidably supports the piston 3, and threadedly engages with female thread 2b formed in the opening of bore 2a. The support 4 permits axial movement of the piston while restricting movement in the radial direction. A spring 5 biases the piston 3 in the protruding or outward direction from the bore. One end of the spring 5 pressure contacts the end face 4a of the support 4. A second end of the spring 5 pressure contacts the end face 6a of a cap 6 that is fixed to the tip of the piston. The cap 6 has a contact part 7 which contacts a tensioner arm (not shown).

A pin member 10 that protrudes from the outer periphery of piston 3 is attached to the rear end of the piston. A cylindrical sleeve 11 is located inside the bore 2a, and is slidably engaged to the outer periphery of the piston 3 to permit axial movement of the piston with respect to the sleeve. The sleeve is positioned for both rotational and axial movement with respect to the bore. An engagement aperture 12 with which the pin member 10 can engage is formed in the sleeve 11.

Figure 4:
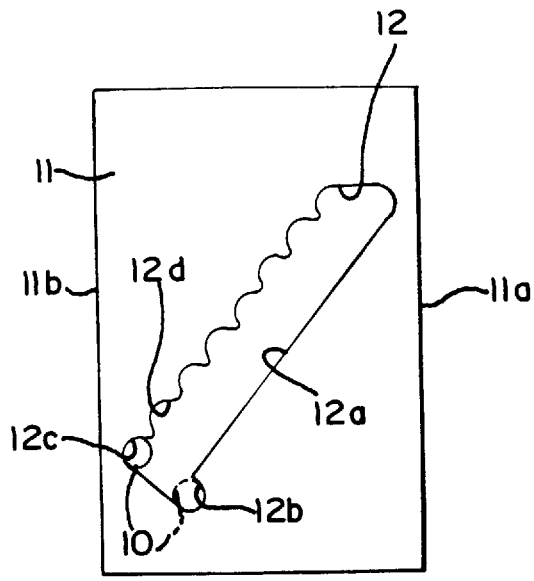
FIG. 4 a partial sectional view of a sleeve of an embodiment of the present invention illustrating the rack cut out from the sleeve.

The engagement aperture 12, shown more clearly in FIG. 4, is a long hole that extends diagonally in the axial direction of the bore (left-right direction in the figure). The engagement aperture 12 has a straight inclined surface 12a. A step or rack member 12b is cut out or formed on one end of the straight inclined surface 12a. The pin member 10 can detachably engage with the rack member 12b. Multiple rack members are cut out from the sleeve, such as 12c and 12d which are formed in a step-like manner on the opposite side of the straight inclined surface 12a. The pin member 10 can detachably engage with the multiple cut out rack members as well to provide a rack and ratchet mechanism.

An elastic member 15 such as an elastic disc spring contacts the rear end face 11b of the sleeve 11 in the bore 2a of the housing 2. Other types of elastic members may be used, for example, a rubber member, Belleville or wave washer (wave-form washer), a rubber member bonded on the face of a flat washer, as well as resin, plastic or sponge members. A fluid chamber 18 is formed in the housing 2 by the inner wall surface of the bore 2a and the rear end face 3a of the piston. Fluid pressure from a fluid pressure source is supplied to the fluid chamber 18 through a check valve 19 located at the bottom of the housing 2. The fluid pressure source may be a reservoir, oil pump, or the like.

An oil passage 3b extends axially along the piston 3 and is connected to the fluid chamber 18. A relief valve 20 opens and closes the oil passage 3b, and is located at the opening on the front end of the oil passage 3b. Also, an oil passage 7a is formed in the cap or tensioner arm contact part 7, and it opens on the front and rear end faces of the contact part 7.

Figure 3:
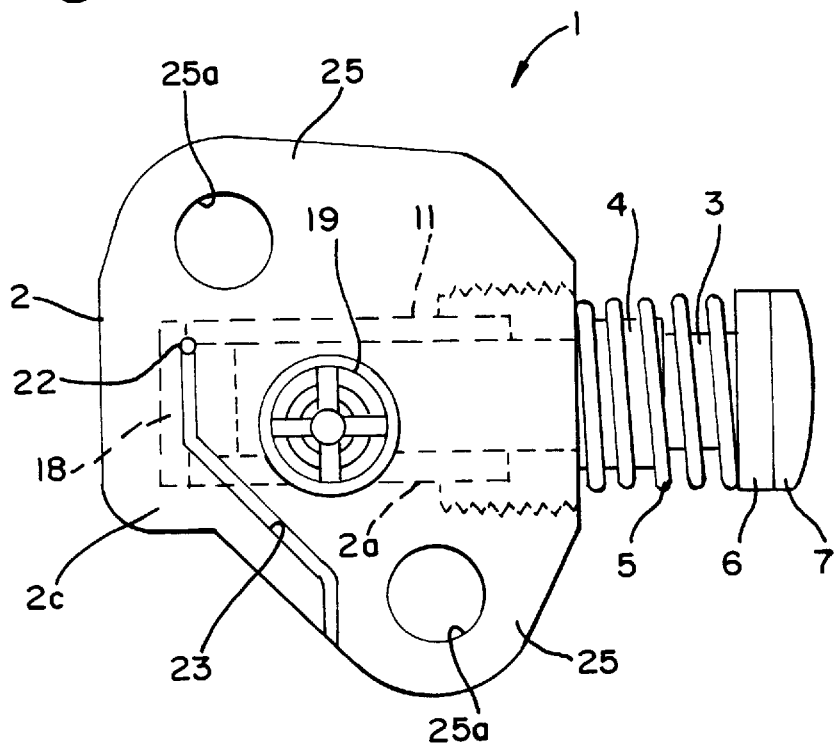
FIG. 3 is a rear plan view of an embodiment of the present invention illustrating the bore in phantom.

One end of an air vent channel 22 and 23, terminates at an opening or aperture in the fluid chamber 18. A second end of the air vent channel terminates at an external attachment surface 2c of the housing 2. As shown in FIG. 3, the air vent channel may include a tortuous path 23 or a circuitous path with turns and directional changes, formed within the housing 2. The air vent channel permits the venting of air to the outside while limiting the flow of oil through the channel.

Figure 2:
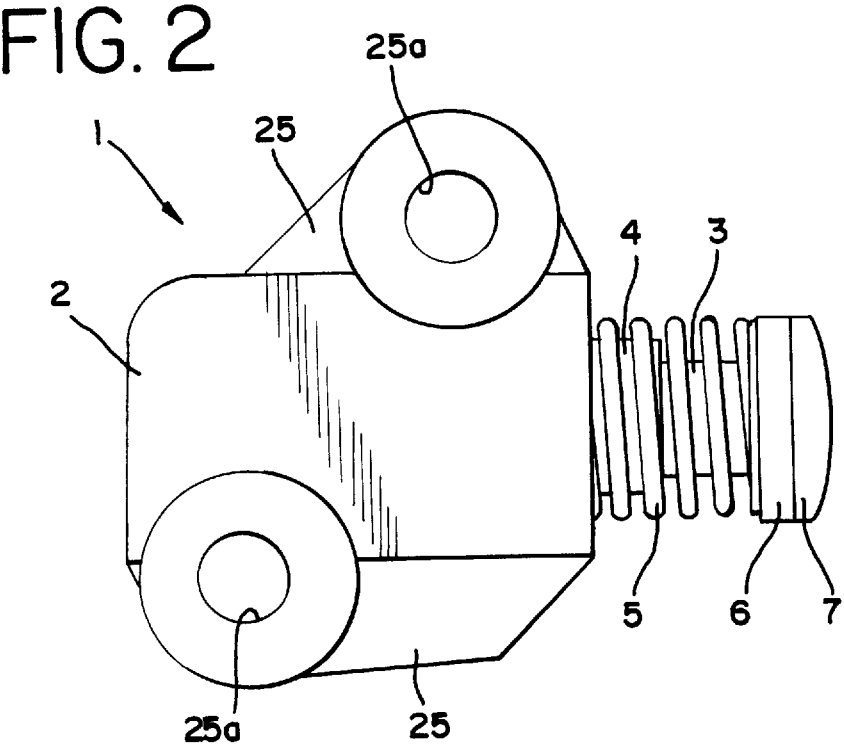
FIG. 2 is a front plan view of an embodiment of the present invention.

Also, an attachment aperture 25a is provided to the side portion 25 of the housing 2 to attach the hydraulic tensioner 1 to the engine block, as shown in FIGS. 2 and 3.

When the hydraulic tensioner 1 is installed in an engine, the pin member 10 is engaged with rack member 12b (FIG. 4, double-dotted line) at the bottom of the engagement aperture 12 by rotating and pushing piston 3 into the housing 2, so that the piston 3 is held in a compressed or retracted position. The hydraulic tensioner is then attached to the engine block or other mounting surface using a bolt inserted and fastened into the attachment aperture 25a.

After the bolt is fastened, the pin member 10 moves rearward in the engagement aperture 12 as contact part 7 at the piston tip is pushed in by the tensioner arm. The pin member thus engages with rack member 12c (FIG. 4, solid line), and the outward force of the piston 3 acts on the tensioner arm.

As the tension of the chain increases during engine operation, a force in the retracting direction acts on piston 3, the pin member 10, and the portion of the engagement aperture contacting the pin member, for example, rack member 12c in the engagement aperture 12.

Figure 5:
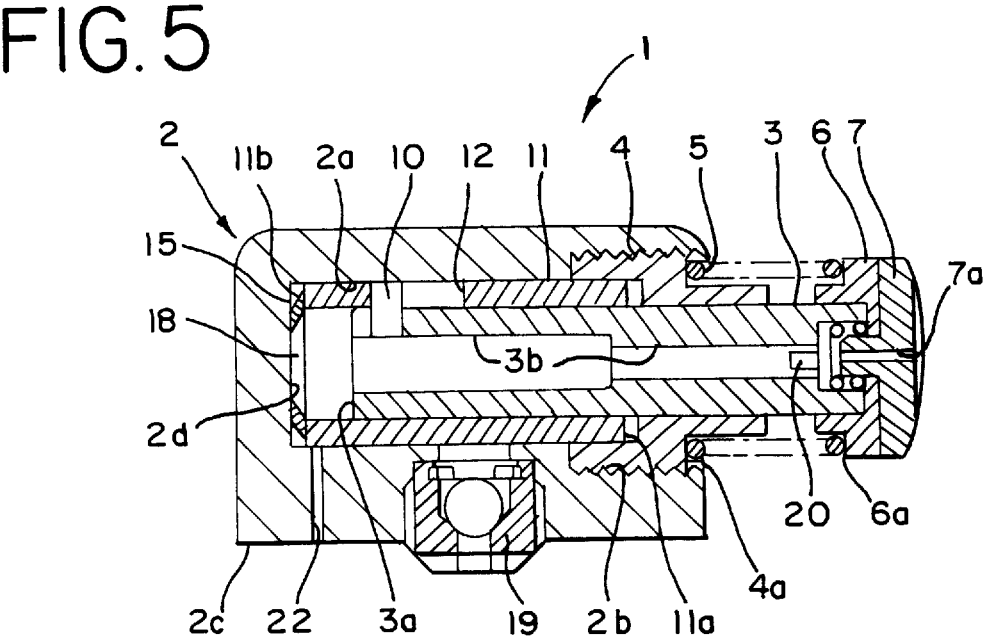
FIG. 5 is a front sectional view that illustrates the operation of an embodiment of the present invention with the piston retracted.

As shown in FIG. 5, the elastic member 15 is located at the rear end 11b of the sleeve 11. The elastic member is compressed between the rear end 11b of the sleeve and the bottom face 2d of the bore. During the retraction of the piston, the pin member 10 contacts the engagement aperture 12 of the sleeve 11. The sleeve 11 retracts slightly due to the compression of the elastic member 15. Because the elastic member absorbs the shock force acting on the sleeve 11, the wear on the engagement aperture 12 and the damage to the pin member 10 are further reduced, improving their durability.

Because the elastic member 15 is provided in the axial clearance between the piston and bore, housing space is conserved and enlargement of the overall housing is not required to accommodate the elastic member.

When the piston 3 retracts and the fluid pressure reaches a predetermined maximum pressure, the oil in the fluid chamber 18 discharges to the outside through oil passages 3b and 7a, via the relief valve 20 at the tip of the contact part 7. Thus, a pressure relief mechanism limits the accumulation of high pressure in the fluid chamber 18.

Figure 6:
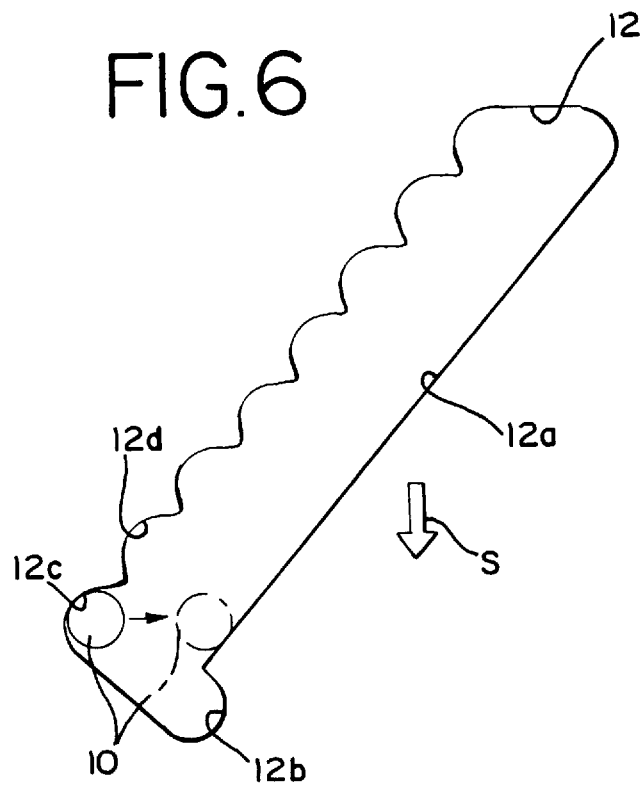
FIG. 6 is a partial sectional view that illustrates the engagement of an engagement aperture and pin member in an embodiment of the present invention.

When the tension of the chain decreases during engine operation, the piston 3 advances due to the force of the spring 5. As a result, as depicted in FIG. 6, the pin member 10 moves from rack member 12c toward the straight inclined surface 12a in the engagement aperture 12.

Figure 7:
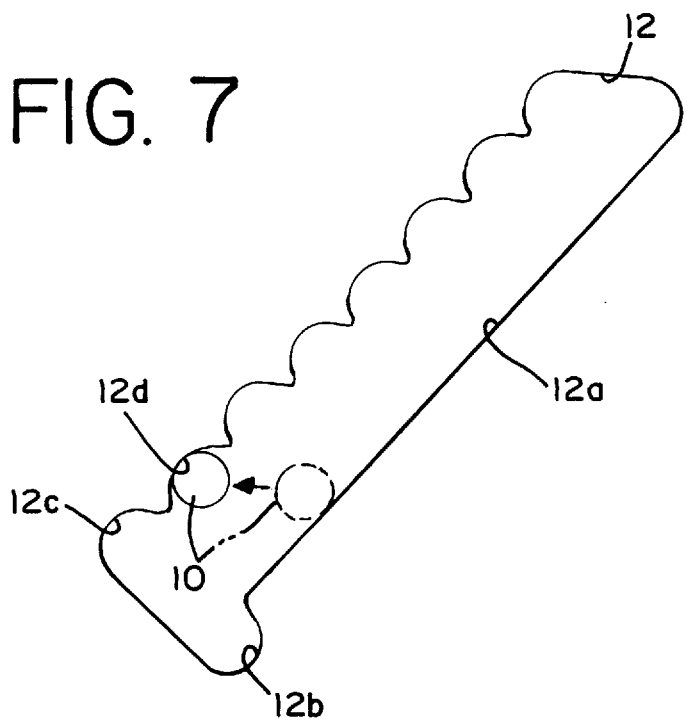
FIG. 7 is a partial sectional view that illustrates the engagement of an engagement aperture and pin member in an embodiment of the present invention.

When the piston 3 advances further, the pin member 10 contacts the inclined surface 12a and the pin member 10 acts on sleeve 11. This force rotates the sleeve 11 in the downward direction of arrow S in FIG. 6. Thus, as shown in FIG. 7, the sleeve rotates and rack member 12d moves to the position opposite the pin member 10.

When a force in the retracting direction acts on piston 3 while the pin member 10 is engaged to rack member 12d (FIG. 7, solid line), the shock force is absorbed by the pin member, rack member 12d and the compression of the elastic member 15.

Figure 8:
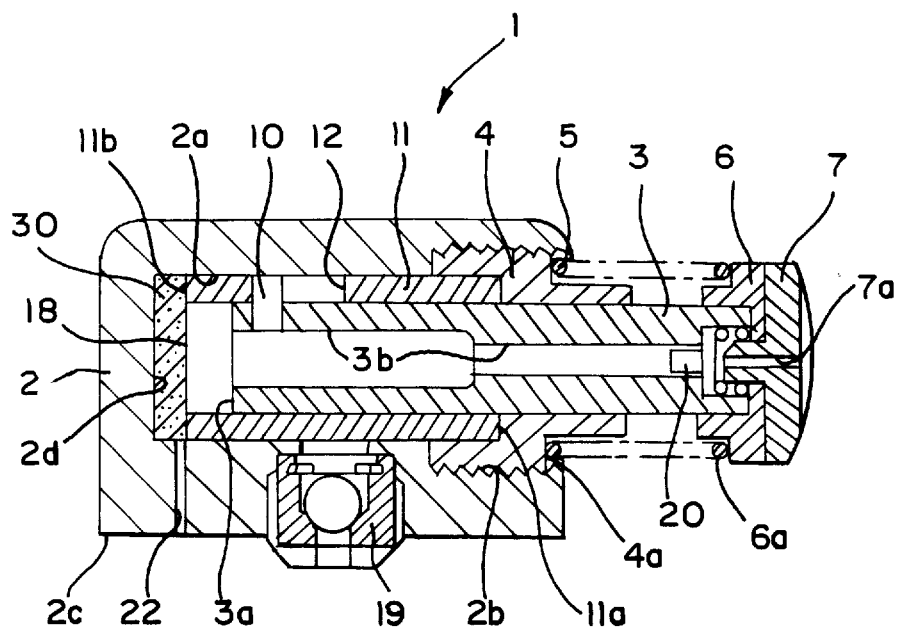
FIG. 8 is a front cross-sectional view of an embodiment of the present invention with the piston retracted.

As discussed above, the elastic member is not limited to an elastic disc spring, and may comprise any suitable material, including a sponge material, for example. FIG. 8 shows an example of such a hydraulic tensioner that employs a sponge member 30 as the elastic member. When the sleeve 11 rotates together with the piston 3 during engine start-up and the sponge member 30 is compressed by the sleeve 11, the oil retained or absorbed by the sponge member 30 is immediately available to the fluid chamber 18 and can be discharged into oil passage 3b in the piston. Thus, the sponge member 30 can provide oil to the fluid chamber and oil passage immediately after engine start-up, even before oil from a fluid pressure source enters the oil passage.

Thus, in the hydraulic tensioner of this invention, the force acting on the piston during engine operation is absorbed by an elastic member at the rear end of the sleeve. The elastic member compresses to absorb the impact of the pin member on the engagement aperture during the retreat of the piston. As a result, wear on the engagement aperture and damage to the pin member is reduced, and durability is increased. Also, use of an elastic member within the sleeve further conserves housing space.

Moreover, in the hydraulic tensioner of the present invention, when the piston retracts, oil in the fluid chamber can discharge to the outside via the relief valve and oil passages. Thus, the pressure in the fluid chamber can be maintained at a proper level for improved durability. Unlike hydraulic tensioners having an oil passage and relief valve located in the housing, the present invention conserves housing space since the oil passage is formed within the piston and the relief valve is in the oil passage.

Those skilled in the art to which the invention pertains may make modifications and other embodiments employing the principles of this invention without departing from its spirit or essential characteristics particularly upon considering the foregoing teachings. The described embodiments are to be considered in all respects only as illustrative and not restrictive and the scope of the invention is, therefore, indicated by the appended claims rather than by the foregoing description Consequently, while the invention has been described with reference to particular embodiments, modifications of structure, sequence, materials and the like would be apparent to those skilled in the art, yet still fall within the scope of the invention.

What is claimed is:

1. A hydraulic tensioner comprising:

a housing having a bore;

a cylindrical sleeve slidably received in said bore for axial and rotational movement within said bore;

a piston slidably received within said sleeve in said bore;

said piston, sleeve and bore forming a fluid chamber therebetween;

a pin member fixedly attached to an outer periphery of said piston;

a spring biasing said piston in a protruding direction from said bore;

a passage in said housing to connect the fluid chamber with a source of fluid;

an engagement aperture with which said pin member can engage;

said aperture formed in said sleeve and extending diagonally in the axial direction within said bore;

said pin member being positioned for engagement with said aperture sides; and an elastic member positioned between said sleeve and said bore.

2. The hydraulic tensioner according to claim 1, wherein said engagement aperture is formed with a straight inclined surface and a rack member cut out on one end of said straight inclined surface, and at least one rack member cut out on the side of said engagement aperture opposite said straight inclined surface.

3. The hydraulic tensioner according to claim 2, wherein said pin member engages said rack members of said engagement aperture, retraction of said piston causing movement of said pin member between said rack members, said rack members engaging said pin member to prevent extension of said piston.

4. The hydraulic tensioner according to claim 1, wherein said elastic member comprises a sponge member.

5. The hydraulic tensioner according to claim 4, wherein an oil passage extends axially within the piston from a rear end face of said piston to an opening at the other end of said piston; and a relief valve in said oil passage that opens and closes to permit the flow of oil through said oil passage.

6. The hydraulic tensioner according to claim 1, wherein said elastic member comprises a disc spring.

* * * * *